Patented Jan. 24, 1928.

1,657,438

UNITED STATES PATENT OFFICE.

GARDNER W. TARR, OF EVERETT, MASSACHUSETTS, ASSIGNOR TO BLUINE COMPANY, OF CONCORD JUNCTION, MASSACHUSETTS, A CORPORATION OF MASSACHUSETTS.

MARINE COATING AND THE LIKE.

No Drawing.   Application filed August 3, 1927.   Serial No. 210,457.

My present invention relates to paints and particularly to that general class of paints known as marine paints, especially those used on ships' bottoms and like places where fouling occurs. The importance of preventing such fouling has long been recognized and consistent efforts have been made to decrease the fouling tendency. One of the prime objects of my present invention is therefore to produce a paint which will prevent to a maximum degree the accumulation of barnacles, grass or other forms of life which are common on vessels in the water for any length of time. I further provide for a paint of general usefulness and durability affording a maximum protection to the parts covered and one easily spread and of great tenacity and durability.

One of the important features of my invention consists in the use of what I believe to be a new factor in paints of this class and one which greatly increases the efficiency of any paint of this type in maintaining a ship's bottom or the like free from fouling. I am not able to explain with certainty just why my invention should have the high efficiency that it shows, but I am able to explain how these results are attained so that any one reasonably skilled in paint manufacture can practice my invention. As stated above, my invention is capable of a variety of embodiments and may be practiced with various types of paint, although the particular type of paint which I will proceed to describe as illustrative of my invention is one with which I have had the greatest success and therefore believe that it represents an important phase of my invention. The general ingredients of such paint I believe to be individually old in the art, although in their combined form they constitute a novel paint. One factor employed by me has not to the best of my knowledge been employed and as far as I know the effect of it has not been attained by the use of any other materials with which I am familiar.

I have discovered that the presence of powdered urea in a metallic paint insures a surface freedom from fouling. In accordance with my concept such a material should be protected against the solvent action of the water so as to be continuously effective during the life of the paint. As before stated, I cannot give an exact explanation for this action, but without intending to be limited thereby I offer the following as a tentative theory which seems to be justified by the results attained. The fouling of a ship's bottom being due to the adherence thereto of various forms of ocean life, notably barnacles, anything which will reduce the adherence will tend to keep the surface free and clean. It seems to be a matter of the elimination of the adhering organisms at an early stage of their growth rather than a matter of absolute prevention or of elimination after the organism has developed to a considerable size. Results seem to indicate that the effect of the urea is to increase the disintegration of the metallic elements of the paint, so that there is what we might call a constant, although very minute wearing away of the paint throughout its life. This wearing away is relatively very slow so that the paint has a practical durability sufficient for all ordinary purposes. With my paint a ship needs repainting no oftener than with any other paint, and in fact, with the freedom from fouling and the decreased need of scraping, my paint will actually render longer service than with ordinary forms of marine coatings.

There is one other theory which might be advanced in accordance with my invention, although as to this I am unable for lack of scientific resources to determine the truth. There are, I believe, developed in my paint certain toxic poisons formed by the urea upon the metals producing metallic salts of urea which I believe have an effect on the immature organisms seeking attachment to the ship bottom. I believe that these poisons weaken the powers of adherence of the organism and it is thus washed away. These two theories, one of which may be said to be mechanical and the other chemical, are merely offered as tentative theories but reliance on theory is not necessary as the results are attainable by following the principles involved in my invention or discovery. For the guidance of those who will hereinafter utilize my invention, I give the following formula and directions as indicating a very satisfactory embodiment in accordance with my invention and as illustrative of the principles involved. In this formula I would set forth one factor which I believe to be of particular importance in my invention as a combinative factor. This is the use of a water resisting binder. As before suggested, I believe that such a binder is important in protecting the powdered urea against solvent action by the water so that it is maintained throughout the paint in an effective form for providing the continuous action necessary to keep the surface free from fouling. For such a binder I use tar, as for example, commercial distilled pine tar. With this I mix ½ coal tar naphtha, ½ creosote naphtha in the proportion of about 3 parts of naphtha to 1 part of tar. To this I add urea preferably in the powdered form in an amount of about ½ lb. to the gallon. For example, I may take 50 gallons of tar and naphtha mixture, add to it 25 lbs. of urea. The creosote also adds certain desirable properties as in the case of wooden vessels where it acts as a preservative and is effective against the boring of worms. In this fluid medium I mix 3 lbs. of copper oxide, 3½ lbs. metallic iron oxide, as for example, Prince's metallic brown which is a brown iron oxide of about 68% to 70% iron content. To this I add one pound of zinc oxide. The foregoing paint will be of a reddish-brown color. The matter of color may be provided for by a mere substitution of different metallic pigments as desired. For yellow color or effect I may use lead chromate. For blue, ferric-ferro-cyanide, or for green, a mixture of these two or any other available metallic pigment. For red, ferric oxide, analyzing about 90% iron.

For the painting of iron surfaces the copper should be omitted or for a second coat on iron which has been previously painted by ordinary paint as the copper tends to react with the iron in the water. As before suggested, the paint may be variously compounded it having a suitable metallic content and preferably having a waterproofing vehicle which will have a protective relation to the urea. The binder may be of any character, although I have a preference for tar. The coal tar naphtha and creosote naphtha I use preferably at a Baumé test of 18° to 20°.

All paints so compounded and having urea or like corrosive or toxic forming action with metals are to be understood as within the concept of my invention which I have defined in the appended claims.

What I therefore claim and desire to secure by Letters Patent is:

1. In a paint of the class described including a metallic compound and powdered urea dispersed throughout the same and in corroding relation to the metallic compound.

2. A paint of the class described comprising a metallic pigment and a vehicle therefor including a waterproofing binder and powdered urea distributed throughout the paint.

3. In a paint of the class described, a body including a metallic compound, a vehicle therefor including a waterproofing binder and powdered urea distributed therein.

4. The method of protecting marine surfaces consisting in coating with a metallic compound in the presence of powdered urea and a waterproofing binder forming a slowly eroding surface in which the metallic content will have an augmented corrosion.

5. The method of protecting marine surfaces consisting in coating with a metallic compound in the presence of powdered urea.

6. A paint of the class described comprising in proportion about 50 gallons of a mixture of 1 part tar and 3 parts solvent, and about 375 pounds of metallic compound and about 25 pounds of powdered urea.

7. A paint of the class described comprising a vehicle including tar, a metallic compound and powdered urea.

In testimony whereof I affix my signature.

GARDNER W. TARR.